UNITED STATES PATENT OFFICE.

MAXIMILIAN SCHARFF AND FRANZ SLAMA, OF LUDWIGSHAFEN-ON-THE-RHINE, GERMANY, ASSIGNORS TO BADISCHE ANILIN UND SODA FABRIK, OF LUDWIGSHAFEN-ON-THE-RHINE, GERMANY, A CORPORATION OF BADEN.

PROCESS OF REMOVING ARSENIC FROM GASES.

No. 798,216.     Specification of Letters Patent.     Patented Aug. 29, 1905.

Application filed June 3, 1903. Serial No. 159,964.

*To all whom it may concern:*

Be it known that we, MAXIMILIAN SCHARFF, a subject of the King of Saxony, and FRANZ SLAMA, a subject of the Emperor of Austria-Hungary, doctors of philosophy and chemists, residing at Ludwigshafen-on-the-Rhine, in the Kingdom of Bavaria, Empire of Germany, have invented new and useful Improvements in Processes of Purifying Gases from Arsenic, of which the following is a specification.

We have discovered that certain metallic oxids—such as iron oxid, (for instance, burnt pyrites,) copper oxid, chrome oxid, manganese oxid, or mixtures of them—exercise at a comparatively slightly elevated temperature a purifying action on burner-gases or other gases containing arsenic by retaining not only the flue-dust and with it such arsenic as at ordinary temperature is present in the form of dust, but also the arsenic vapors present in hot burner-gases. This purifying action is exerted at temperatures under red heat—that is, at temperatures beneath those at which the above-mentioned oxids exercise any appreciable catalytic influence on the gaseous mixture. It is characteristic of our new process that the purification of gases such as are intended for use in the contact process of making sulfuric anhydrid is effected without essentially altering the amount of sulfurous acid contained in the gaseous mixture, owing to the absence of any appreciable catalytic action of the above oxids on the same.

The above-mentioned metallic oxids can, if desired, be used in combination with the porous bodies mentioned in our application for Letters Patent, Serial No. 159,965, of even date herewith.

Our new process consists in bringing the gases to be purified into intimate contact with the above-mentioned metallic oxids by passing the gases over or through the same at an elevated temperature, preferably at or over a temperature of two hundred degrees centigrade, ($200°$ C.,) but under a temperature of red heat. By this means in addition to the arsenic other impurities which are deleterious in the contact process can be removed from gases.

Although this process is especially intended for the purification of burner-gases such as are intended for the manufacture of sulfuric acid by the contact process, other sulfurous gases containing arsenic can be purified in this way and the purified gases obtained can also be employed for other technical purposes.

The following is an example of a way in which our invention can be carried into practical effect; but our invention is not limited to this example:

Fill a brick-lined tower provided at the lower end with a grating of iron or stone with pieces of iron oxid as it comes from the pyrites-burners and pass the gases which are to be purified in an upward direction through the tower. The gases on entering the tower should possess a temperature of from three hundred and fifty to four hundred degrees centigrade ($350°$–$400°$ C.) and should have been previously passed through a dust-collecting chamber for the purpose of cooling them to this temperature and of allowing the larger solid particles to deposit. From time to time the undermost portion of the material should be removed from the lower part of the tower and an equal quantity of fresh material be introduced at the upper part of the tower, so as to avoid choking. The depth of the material which should be used depends to some extent upon the velocity of the gases to be purified and the degree of purity which it is desired they shall attain. The issuing gases should be tested from time to time to ascertain whether the desired purification has been effected, and if it has not been then either a greater depth of filtering material should be used or the velocity of the gases should be diminished.

Instead of iron oxid other oxids—such as copper oxid, chromium oxid, or the like—can be used.

Although we have mentioned a tower which is assumed to be vertical, it is not essential that such a tower should be used, as, if desired, a horizontal or an inclined container or shaft may be employed.

We claim—

1. The process of purifying sulfurous gases containing arsenic by passing the said gases at a temperature over $200°$ centigrade, but under that of red heat, over or through an aforementioned metallic oxid thus removing the arsenic while retaining the gases in an unconverted condition.

2. The process of purifying sulfurous gases containing arsenic by passing the said gases at a temperature over 200° centigrade, but under that of red heat, over or through iron oxid thus removing the arsenic while retaining the gases in an unconverted condition.

In testimony whereof we have hereunto set our hands in the presence of two subscribing witnesses.

MAXIMILIAN SCHARFF.
FRANZ SLAMA.

Witnesses:
ERNEST F. EHRHARDT,
JACOB ADRIAN.